H. H. ROBERTSON.
COMPOSITE BOARD.
APPLICATION FILED JULY 28, 1916.
1,292,067.
Patented Jan. 21, 1919.
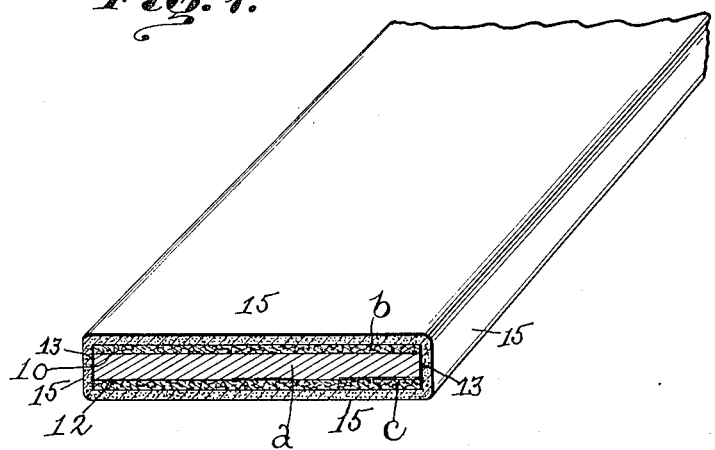
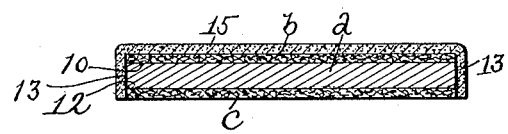
Inventor:
Harold H. Robertson
by Jas. H. Churchill
atty.

UNITED STATES PATENT OFFICE.

HAROLD H. ROBERTSON, OF SEWICKLEY, PENNSYLVANIA, ASSIGNOR TO ASBESTOS PROTECTED METAL COMPANY, OF PITTSBURGH, PENNSYLVANIA, A CORPORATION OF PENNSYLVANIA.

COMPOSITE BOARD.

1,292,067.   Specification of Letters Patent.   Patented Jan. 21, 1919.

Application filed July 28, 1916. Serial No. 111,935.

*To all whom it may concern:*

Be it known that I, HAROLD H. ROBERTSON, a British subject, and a resident of Sewickley, in the county of Allegheny and State of Pennsylvania, have invented an Improvement in Composite Boards, of which the following description, in connection with the accompanying drawings, is a specification, like characters on the drawings representing like parts.

This invention relates to a composite board, especially designed and adapted among other uses, to be employed in the construction of temporary buildings or structures, such as warehouses, construction camps, and also for the walls and roofs of permanent structures, such as garages, portable hospitals, bungalows and other structures.

The invention has for its object to provide a composite board, which is capable of being made and used of any desired size within limits, which is weather and fire resisting, which is stiff and self-sustaining and can be made of material thickness without correspondingly increasing its weight, which is capable of being sawed and fitted on the job the same as lumber and can be easily punctured by nails, and which is light and inexpensive. A composite board having these characteristics is composed of a non-metallic member in sheet form and of substantial thickness, which is interposed between and adhesively secured to thinner outside layers or sheets of asbestos paper or felt or like fire-resisting material, one, and in some cases, both of which layers may be provided with an exterior surface coating of fluxed asphalt, and one of which may and preferably will be saturated with asphalt or like hydrocarbonaceous material.

When the composite board is applied to the studs or other frame of the building, and the inner surface of said board is to be left exposed, the asbestos layer which forms the exposed inner surface of the board is preferably filled or sized with a colorless material, which provides a receptive surface for paint or other decoration.

These and other features of this invention will be pointed out in the claims at the end of this specification.

Figure 1 is a perspective view of a portion of a composite board embodying this invention, and Fig. 2, an end view of a modified construction of board.

Referring to the drawing, *a* represents the center member of the composite board, and *b*, *c*, the outside layers of asbestos paper or felt or like fire-resisting material.

The member *a* is made of non-metallic material, and may be composed of fibrous material, such as wood pulp, old newspaper stock, or similar inexpensive paper stock, impregnated with a suitable size or stiffener, such as is commercially used as wall board, or it may be of substantially heavy felt, or other light non-metallic material.

The center member *a* is of material thickness yet light, and the asbestos layers *b*, *c*, are relatively thinner and are affixed to the opposite surfaces of the member *a*, preferably by means of layers of asphalt, represented by the heavy black lines 10, 12, and the said asbestos layers may also be attached to the center member *a* by means of layers 13 of asphalt applied to the opposite side edges of said layers and center member.

One of the asbestos layers, as, for instance, the layer *b*, which is to form the exterior layer of the board when the latter is applied to the studs or other part of the building, is preferably saturated with asphalt, and the entire board may be provided with a protective layer 15 of asphalt, such as a fluxed asphalt.

In cases where the board is to be left exposed on the interior of the building or other structure, one of the asbestos layers, as, for instance, *c*, is left uncovered by the protective layer 15 of asphalt as shown in Fig. 2, and is for the best results provided with a colorless filling or size to provide a surface, which is receptive for paint or other decoration.

The non-metallic center member of the composite board is capable of being made of material thickness without a corresponding increase in weight, and can be made of any desired area within limits, and possesses the desired stiffness to enable it to be self-sustaining and capable of being handled without inconvenience, and when associated with the other elements of the composite board, there is produced a board, which is not only inexpensive and light, but one which is weather and fire resisting, and capable of being sawed and fitted on the job, and also of having nails driven through it with ease and without the necessity of first puncturing the center member.

In other words, the composite board is available for temporary structures, and also for inexpensive permanent structures.

I have herein described one construction of non-metallic composite board, which I may prefer, but it is not desired to limit the invention to the particular construction shown.

Claims:

1. A composite board of the character described, comprising a center member of non-metallic material which is homogeneous throughout its mass, is of substantial thickness yet light and of suitable stiffness to render it self-sustaining, and which is capable of being readily punctured by fastening devices and of being sawed and fitted on the job, layers of asbestos paper or felt adhesively affixed to the opposite surfaces of said center member, and a protective layer of fluxed asphalt which is substantially non-adhesive at ordinary temperatures but is rendered adhesive by heat and which envelops said center member and said asbestos layers.

2. A composite board of the character described, comprising a center member of non-metallic material which is homogeneous throughout its mass, is of substantial thickness yet light and of suitable stiffness to render it self-sustaining, and which is capable of being readily punctured by fastening devices and of being sawed and fitted on the job, fire-resisting layers adhesively affixed to the opposite surfaces of said center member, and a protective layer of substantial thickness which is substantially non-adhesive at ordinary temperatures but is rendered adhesive by heat, and which is applied to one of said fire-resisting layers and to the sides of said center member.

3. A composite board of the character described, comprising a center member of non-metallic material which is homogeneous throughout its mass, is of substantial thickness yet light and of suitable stiffness to render it self-sustaining, and which is capable of being readily punctured by fastening devices and of being sawed and fitted on the job, relatively thin layers of fire-resisting material adhesively affixed to said center member and one of which is saturated with asphalt, and a protective layer of fluxed asphalt of substantial thickness which is substantially non-adhesive at ordinary temperatures but is rendered adhesive by heat and which is applied to said saturated fire-resisting member and to the sides of said center member.

In testimony whereof, I have signed my name to this specification.

HAROLD H. ROBERTSON.